May 7, 1968  Z. HAVELKA  3,381,799
CONVEYORS
Filed Oct. 14, 1966  3 Sheets-Sheet 1
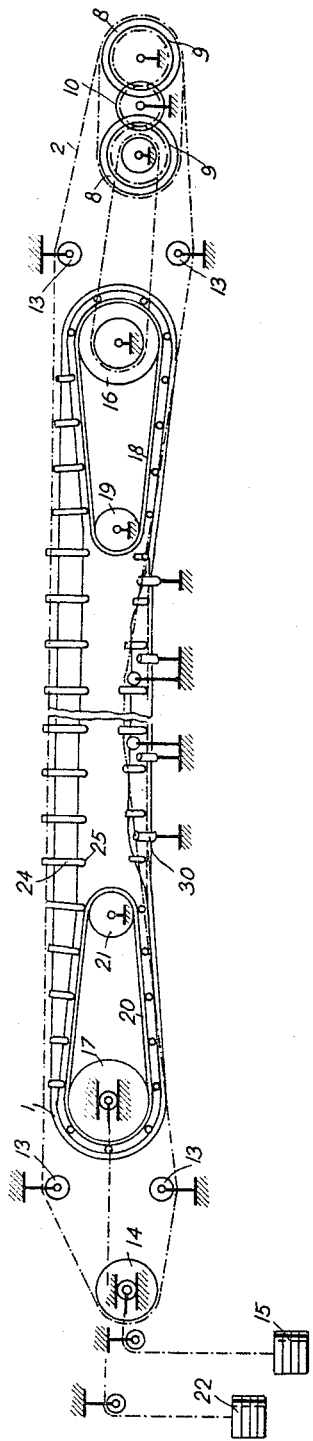
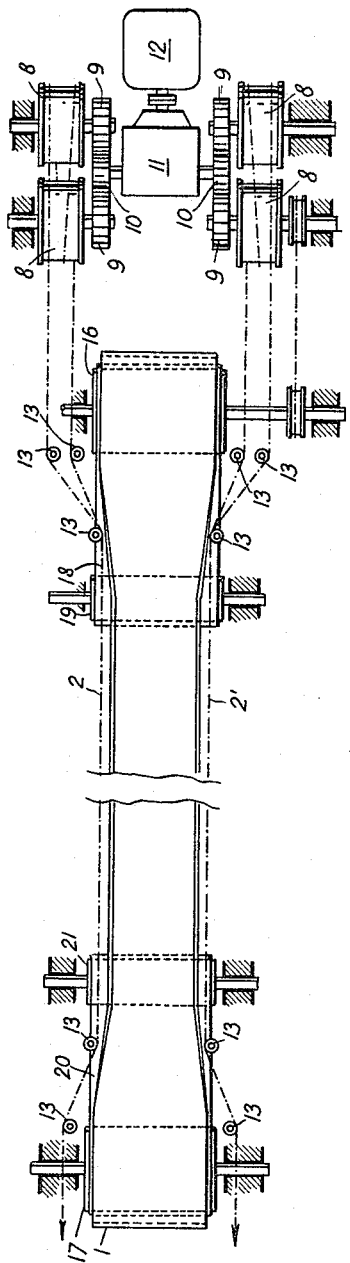
INVENTOR.
Zdeněk Havelka INVENTOR.
Zdeněk Havelka INVENTOR.
Zdeněk Havelka

United States Patent Office 3,381,799
Patented May 7, 1968

3,381,799
CONVEYORS
Zdeněk Havelka, Prague, Czechoslovakia, assignor to TRANSPORTA, oborovy podnik, Chrudim, Czechoslovakia
Filed Oct. 14, 1966, Ser. No. 586,777
10 Claims. (Cl. 198—191)

ABSTRACT OF THE DISCLOSURE

A belt conveyor which can adapt itself to the characteristics of the load which is to be carried. The conveyor has an endless belt which is to carry the load, and this belt is supported at its upper run by transversely extending hanger assemblies which at the upper run of the conveyor extend beneath the belt and are themselves suspended from a pair of endless ropes that are driven to operate the conveyor. The hanger assemblies can automatically swing in response to the load on the belt so as to automatically assume a U-shaped configuration conforming to the load and giving the belt at its upper run a trough-shaped configuration which will be determined by the load itself. At one side, each of the hanger assemblies at the upper run can move freely toward the opposite side of the hanger assembly so that the horizontal forces are greatly reduced.

---

The present invention relates to conveyors.

More particularly the present invention relates to belt conveyors of the type wherein a pair of ropes carry supporting crossbars or the like on which the belt itself is supported.

Although it is known to provide endless belts which not only carry a load but which also are pulled so as to transport the load, such belts are required to be reinforced by such expedients as fabric laminations or steel filaments embedded in the belts, so that such belts are expensive and require large heavy frame structures with a large number of roller assemblies in order to support the belts properly.

Also there are belt conveyors where instead of drawing the belt by way of forces applied to the belt itself, the belt is carried by elongated ropes which are drawn and which support the belt by way of crossbars or the like, as referred to above. While this latter type of belt avoids the drawbacks of requiring the belt itself to have an expensive construction with reinforcements imbedded therein, for example, this construction has the drawback of being capable of receiving only a relatively small load, so that its use is limited. It is not possible with constructions of this latter type to enlarge the trough-shaped hollow interior of the belt where the load is situated because the belt is supported by transversely extending crossbars or the like. When the belt has its load increased relatively large horizontal forces are applied to the ropes which support the crossbars which carry the belt, thus increasing the load and stress on these ropes with the resulting wear of the rollers or pulleys for the ropes as well as the ropes themselves. With this latter type of construction the ropes often become separated from the belt.

Even where the transverse crossbars are resilient or made up of hingedly connected components, there are considerable horizontal forces acting on the ropes and pulleys, and these horizontal forces usually are more than 25% of the vertical forces.

The load may be on the order of hundreds of kps., thus producing the above mentioned undesirable stresses on the ropes and pulleys, and these horizontal forces also have an unfavorable effect on the bearings of such assemblies.

It is accordingly a primary object of the present invention to provide a conveyor structure of the above general type which will, however, avoid the above drawbacks.

Thus, it is an object of the invention to provide a conveyor construction which will be subjected substantially exclusively to vertical forces, eliminating horizontal forces on the ropes and their bearing structures.

Also, it is an object of the present invention to provide a conveyor of the above general type wherein the belt which carries the load can automatically adapt itself, without any particular problems, to the characteristics of the load.

Furthermore, it is an object of the present invention to provide a conveyor construction of the above type where assemblies which support the belt are capable of advancing without difficulty around rotary end guides where the upper run of the belt is joined to the lower run thereof.

Furthermore, it is an object of the invention to provide a construction of the above general type which is exceedingly rugged while at the same time being quite simple, so that the conveyor of the invention can be manufactured at a low cost and will at the same time have a long operating life.

Also, it is an object of the invention to provide a conveyor construction which lends itself to long paths along which a load can be conveyed while also making it possible to change the direction of movement of the load so that it need not move precisely along a straight line.

In accordance with the present invention the conveyor includes a pair of endless supporting ropes each of which has a forwarding run and a return run, and at least the forwarding runs of these ropes are substantially coextensive and are situated substantially at the same elevation. A pair of support means respectively support the endless ropes for respective movement along endless paths which are described by these ropes, and in accordance with the invention a plurality of transverse hanger assemblies are arranged in an endless row having an upper section and a lower section with the fraction of the plurality of transverse hanger assemblies which at any given instant are situated at the upper section of the row extending transversely between and being carried by the forwarding runs of the ropes.

Each transverse hanger assembly includes a pair of side bars each of which has an inner end and outer end, an intermediate bar extending between the side bars and having opposed ends situated respectively adjacent the inner ends of the side bars, and a pair of transition bars respectively having inner ends situated at the intermediate bar inwardly of the opposed ends thereof, these transition bars respectively having outer ends which are respectively situated at intermediate portions of the side bars. Each side bar has a hook-shaped configuration at its outer end and these hook-shaped ends of the side bars extend around and rest on the forwarding runs of the ropes. Furthermore, each hanger assembly of the invention includes a pair of swingable connecting means swingably connecting the inner ends of the side bars to the intermediate bar at the region of the opposed ends thereof, respectively, for swinging movement relative thereto about axes which extend in the same general direction as the forwarding runs of the ropes. Each hanger assembly further includes a pair of shiftable connecting means shiftably connecting the transition bars at least at one of the ends thereof for longitudinal shifting movement along that one of the bars where the said one end of the transition bar is situated, and the swingable and shiftable connecting means of each hanger assembly provides for all of the bars thereof a range of movement relative to each other sufficiently great to displace the bars from a fully extended position, where all of the bars extend substantially along a straight line which is perpendicular to the forwarding runs of the ropes, to a supporting position where at least those hanger assemblies which at any given instant are situated at the upper section of the row of hanger assemblies form a supporting unit having the side bars thereof extending downwardly and inwardly from the forwarding runs of the ropes with the intermediate bar extending between the inner ends of the side bars at an elevation substantially lower than the forwarding runs of the ropes and where the transition bars are respectively situated over the ends of the intermediate bar and extend between the side bar and intermediate bar.

An endless load-carrying belt has upper and lower runs and has its upper run provided with opposed side edge portions situated between and resting against the side bars of those hanger assemblies which are situated at the upper section of the row over the intermediate portions of the side bars where the upper ends of the transition bars are located, and the upper run of this belt rests below its opposed side edge portions with a lower face of the upper run on the transition bars, this upper run of the endless belt having between the transition bars a longitudinal central section having its lower face engaging the intermediate bars between the transition bars of the hanger assemblies. The belt is connected with the intermediate bars between the transition bars of the hanger assemblies, so that those hanger assemblies which at any given instant are situated at the upper section of the row and which are carried by the forwarding runs of the ropes provide for the upper run of the flexible load-carrying belt a trough-shaped configuration which can automatically adapt itself to a load carried by the belt with automatic swinging and shifting of the bars of the hanger assemblies at the upper section of the row in response to the load acting on the upper run of the belt.

A pair of rotary and guide means are provided for guiding the endless belt for transition between its upper and lower runs, this endless belt extending around the pair of rotary end guide means which respectively form a return guide means, where the belt undergoes transition from its upper run to its lower run, and a starting guide means toward which the lower run of the belt moves and around which the belt is guided during transition from its lower to its upper run. This pair of end guide means respectively coact with the plurality of hanger assemblies for displacing them between their extended and supporting positions. Thus, the return guide means coacts with the plurality of hanger assemblies during transition of the latter from their supporting to their extended positions, while the starting guide means coacts with the plurality of hanger assemblies during transition thereof from their extended to their supporting positions. The hook-shaped ends of the side bars of the hanger assemblies automatically engage forwarding runs of the ropes during transition of the hanger assemblies from their extended to their supporting positions, and these hook-shaped ends of the side bars of the hanger assemblies become displaced from the forwarding runs of the ropes to be automatically disengaged therefrom during transition of the hanger assemblies from their supporting to their extended positions.

The invention is illustrated by way of example in the accompanying drawings which form part of this application and in which:

FIG. 1 is a schematic side elevation of one possible embodiment of a conveyor according to the present invention;

FIG. 2 is a schematic plan view of the conveyor of FIG. 1;

Figure 3A:
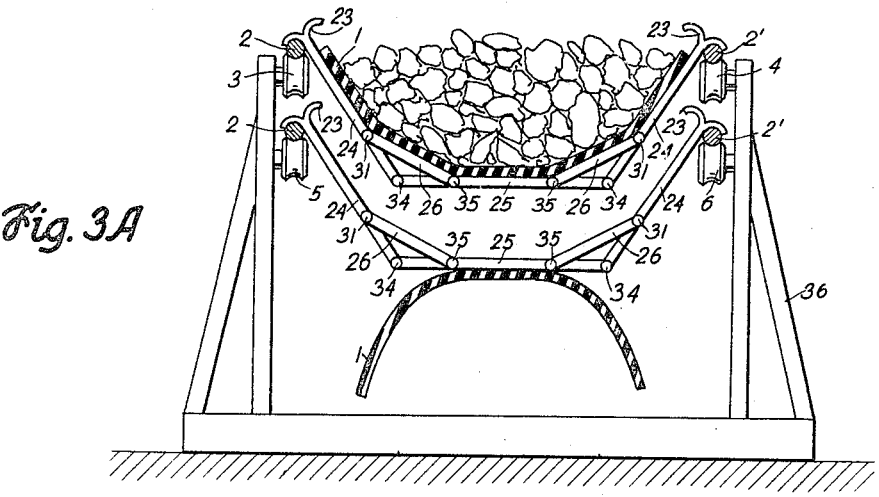
FIG. 3A is a transverse section showing one possible embodiment of the conveyor structure of the invention.

Referring now to FIGS. 1 and 2, the conveyor of the invention illustrated therein includes an elongated flexible endless conveyor belt 1 and a pair of rotary end guide means 16 and 17 around which the belt 1 is guided. The rotary guide means 16, which may take the form of a suitable roller, forms a return guide means around which the belt is guided during transition from its upper run to its lower run, the upper run of the belt 1 moving toward the right, as viewed in FIG. 1, from the starting guide means 17 toward the return guide means 16, and the lower run of course advances toward the starting rotary guide means 17 to be guided around the latter during transition of the belt 1 from its lower to its upper run. This rotary guide means 17 can also take the form of a suitable roller or drum, in the same way as the rotary roller or drum 16. However, a weight 22 is connected by ropes, which are guided over suitable pulleys or the like, as shown schematically in FIG. 1, to the starting guide means 17 so as to pull the latter toward the left and thus maintain the belt at a suitable tension.

A pair of ropes 2 and 2' which may be made of wire, hemp, or any other suitable material, serve to support and advance the flexible load-carrying belt 1. The ropes 2 and 2' are endless and at least their upper, forwarding runs are substantially coextensive. The pair of lateral ropes 2 and 2' are guided around and connected with the driving drums 8 shown at the right in FIG. 2, and these drums 8 are respectively connected with gears 9 which in turn are driven from pinions 10 driven through a suitable step-down, reduction gearing unit 11 which is driven from a motor 12, so that in this way the drive is transmitted to the endless ropes 2 and 2'. At their ends distant from the driving drums 8 the ropes 2 and 2' are guided around a rotary drum or roller 14 which is acted upon by a weight 15 connected through suitable ropes guided around pulleys to the ends of the rotary drum 14, so as to provide a tension directed to the left, as viewed in FIG. 1 and acting on the rotary drum 14. In this way a suitable tension is maintained in the ropes 2 and 2'. In addition these ropes 2 and 2' are guided by suitable rotary guide elements 13 which are distributed about and located at various locations of the conveyor, as is apparent from FIGS. 1 and 2. Thus, it will be noted that while the rollers 13, which may be pulleys also, guide the ropes 2 and 2' to and from the drum or roller 14 as well as to and from the driving drums 8, the rollers 13, as is particularly apparent from FIG. 2, also serve to guide the ropes in the region of the return guide means 16 outwardly away from the latter and back toward the region of the side edge portions of the upper run of the belt 1.

A plurality of hanger assemblies of the present invention serve to support the belt 1 on the upper forwarding runs of the ropes 2 and 2'. The plurality of hanger assemblies of the conveyor of the invention extend transversely with respect to the belt and ropes and are distributed along a row which has an upper section and a lower section. That fraction of the plurality of hanger assemblies of the invention which at any given instant are situated at the upper section of the row of hanger assemblies support the belt 1 in the manner shown in detail in FIGS. 5A and 6A, as well as in FIGS. 3A and 3B and FIG. 4.

Figure 4:
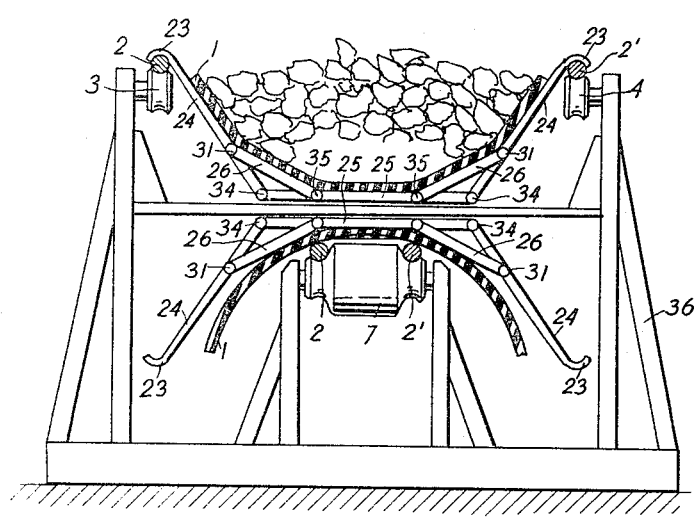
FIG. 4 is a transverse section showing yet an additional embodiment of a structure according to the present invention.
Figure 5A:
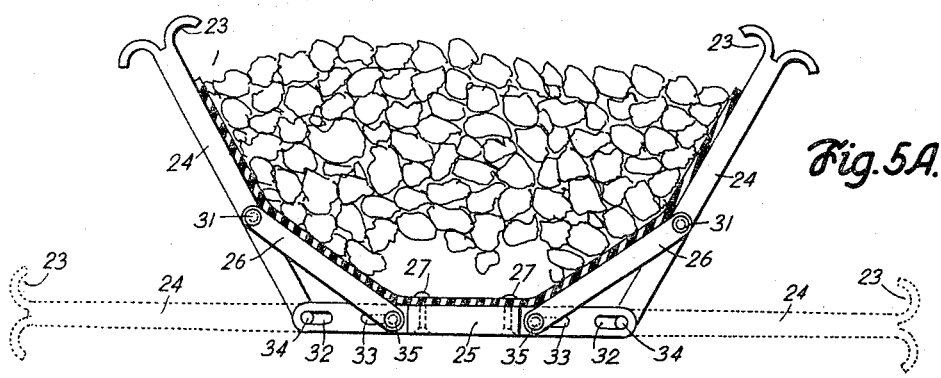
FIG. 5A is a transverse section showing the details of a hanger assembly of the invention, this assembly being shown in dotted lines in its extended position in FIG. 5A.
Figure 5B:
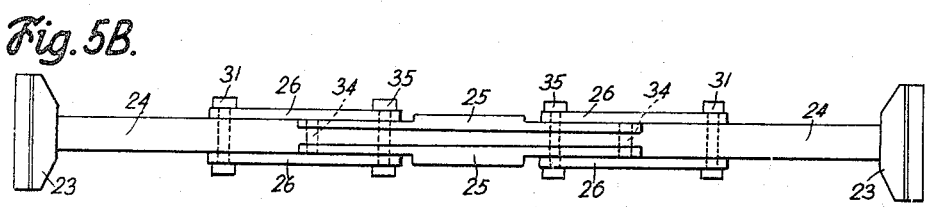
FIG. 5B is a plan view showing how the hanger assembly of FIG. 5A appears when seen from above in its extended position.

Referring to FIGS. 5A and 5B, it will be seen that the hanger assemblies of this embodiment, one of which is shown in detail in FIGS. 5A and 5B, each include a pair of side bars 24 and an intermediate bar 25. The side bars 24 have inner ends respectively situated adjacent opposed outer ends of the intermediate bar 25. The outer ends of the side bars 24 have a hook-shaped configuration so as to be provided with the hooks 23 which extend around and rest on the ropes 2 and 2' at those hanger assemblies which are situated at the upper section of the row of hanger assemblies, and the engagement of the outer hook-shaped ends of the side bars 24 with the ropes in illustrated in FIGS. 3A, 3B, 4 and 6A.

A pair of swingable connecting means are provided for swingably connecting the inner ends of the side bars 24 to the outer ends of the intermediate bar 25, respectively, and in the example of FIG. 5A the pair of swingable connecting means include the outer end portions of the bar 25, which are formed with the elongated slots 32, and pins 34 respectively carried by the lower ends of the side bars 24 and extending through the slots 32, so that with this construction the side bars 24 are capable not only of swinging with respect to the bar 25 but also of shifting longitudinally with respect thereto.

Each hanger assembly of the invention further includes a pair of transition bars 26 which in the example of FIG. 5A are pivotally connected by pivots 31 to regions of the side bars 24 which are respectively situated intermediate the ends thereof, and at their inner ends the transition bars 26 respectively carry pins 35 which pass through an additional pair of inner slots 33 respectively formed in the bar 25, so that the pins 35 and slots 33 form a shiftable connecting means for shiftably connecting the transition bars 26 to the bar 25. The pair of swingable connecting means, providing the connections between the side bars 24 and the intermediate bar 25, and the pair of shiftable connecting means, providing the connections between the transition bars 26 and the intermediate bars 25, provide for all of the bars a range of movement sufficiently great to enable the bars to move from the solid-line supporting position thereof shown in FIG. 5A to the dotted line extended position thereof shown in FIG. 5A. It will be noted that in the extended position, which is shown in plan view in FIG. 5B, the bars of each hanger assembly extend along a straight line, while in the supporting position shown in solid lines in FIG. 5A the bars automatically form a substantially U-shaped assembly to enable the belt 1 to be supported in such a way that it has a trough-shaped configuration. Because each hanger assembly of the invention is capable of automatically assuming whatever configuration is called for by the load which is carried by the belt 1, the structure of the invention does not transmit any appreciable horizontal forces to the ropes 2 and 2', so that the latter are required to carry only vertical forces and in addition there is no possibility of undesirable deformation of the belt 1 with the structure of the invention.

The ends of the slots 32 and 33 from abutments for the pins 34 and 35, respectively, when the parts are in the extended position shown in FIG. 5.

Figure 6A:
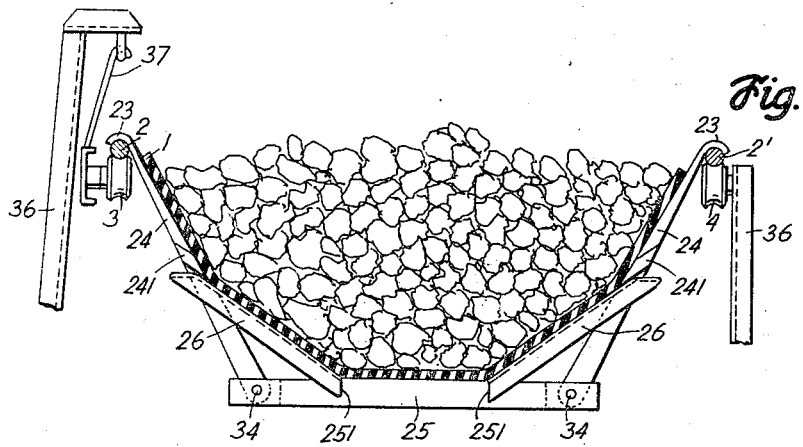
FIG. 6A is a transverse section of another possible embodiment of a conveyor according to the present invention.
Figure 6B:
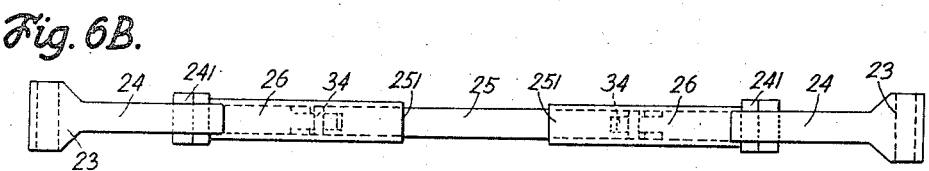
FIG. 6B is a top plan view of the hanger assembly of FIG. 6A shown in its extended position.

According to the embodiment of the invention which is illustrated in FIGS. 6A and 6B, the side bars 24 are provided with forwardly and rearwardly extending projections 241 while the intermediate bar 25 has projections 251 inwardly of its opposed ends. In this case the pair of transition bars 26 are in the form of elongated channel members which receive the side bars and intermediate bar in their interiors, and the projections 241 overlap free ends of the channel members 26 of FIG. 6A while the projections 251 overlap the inner and lower free ends of the channel members 26 of FIG. 6A so that in this way the channel members 26 are retained assembled with the structure while at the same time being capable of shifting with respect to the side and intermediate bars. The structure is shown in its extended position in FIG. 6B which also shows the structure in a plan view. With this embodiment although the shiftable connecting means is formed by the receiving of the side and intermediate bars in the interior of the channel members 26, the pair of swingable connecting means are in the form of simple pivotal connections of the inner ends of the side bars 24 to the opposed outer ends of the intermediate bar 25, and in this case also the structure is capable of being displaced between the supporting position shown in FIG. 6A and the extended position shown in FIG. 6B, where all of the bars are situated along a straight line. In this extended position the stops 241 and 251 are still situated over the free ends of the channel members 26 so that the latter are retained assembled with the remainder of the components of the hanger assembly of FIGS. 6A and 6B.

As is shown in FIGS. 5A and 6A, the upper run of the belt 1 has a pair of opposed side edge portions resting against the side bars 24 of the hanger assemblies, and the lower face of the upper run of the belt 1 also rests directly on the transition bars 26 of the hanger assemblies of the invention. The belt 1 has a longitudinal central section which is fixed with the intermediate bars 25 inwardly of the transition bars 26, and of course the lower face of the upper run of the belt 1 engages the intermediate bars inwardly of the transition bars 26. The connection of the belt 1 to the intermediate bars 25 can be provided through a releasable connecting means taking the form of, for example, suitable bolt and nut assemblies 27 which can be disassembled when desired so as to disconnect the belt 1 from the hanger assemblies.

Thus, the hanger assemblies of the invention are simple while at the same time being very rugged and are capable of efficiently supporting the belt 1 when the latter carries a load, this support being at least as good as that of a one-piece crossbar which is of a bowed configuration.

Figure 3B:
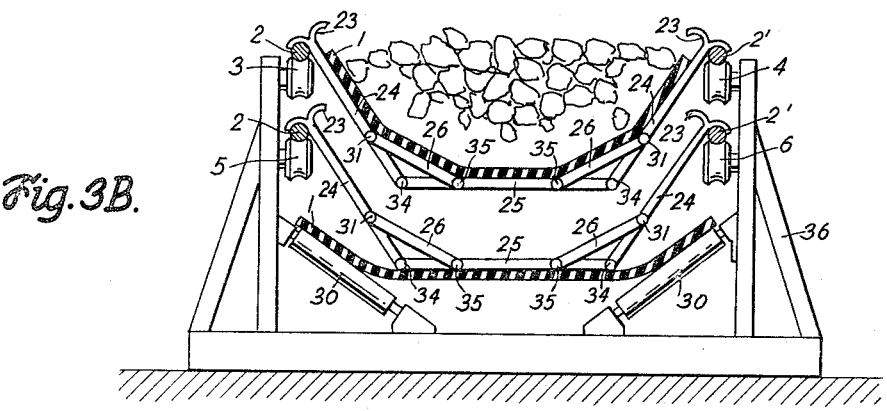
FIG. 3B is a transverse section showing another possible embodiment of the structure of the invention.

A support means is provided for supporting the ropes 2 and 2' particularly at their upper forwarding runs, and, as is shown in FIG. 6A, the support means can take the form of a series of frameworks 36 supporting suitable rotary pulleys 3 and 4 on which the ropes 2 and 2', respectively, are supported and guided for movement. FIGS. 3A and 3B show lower pulleys 5 and 6 carried by the supporting frameworks 36 and supporting the return runs of the ropes 2 and 2', respectively. Thus, in FIGS. 3A and 3B the pulleys 3 and 5 coact only with the rope 2 while the pulleys 4 and 6 coact only with the rope 2'.

Referring to FIG. 6A, it will be seen that the left supporting frameworks 36 carry stationary hooks engaged by the upper hook-shaped ends of rods 37 which at their lower ends are fixed to brackets which carry the pins on which the pulleys 3 are respectively supported for rotary movement. Thus, with this construction the pulleys 3 are capable of freely swinging toward and away from the pulleys 4, so that in this way whenever required by the characteristics of the load, it is possible for the forwarding run of the rope 2 to advance toward and away from the forwarding run of the rope 2' and in this way horizontal stresses are greatly reduced and substantially eliminated.

As a result of this construction the conveyor belt 1 is able to assume any trough-shaped configuration required by the load, so that the trough formed by the upper run of the belt 1 can be shallow or deep. It is possible with this construction to obtain an interior cross section for the upper run of the belt 1 which is 50–70% larger than with known constructions where the belts are supported by crossbars, so that with the structure of the invention it is possible to efficiently carry much larger loads than was heretofore possible, even with belt conveyors which were supported from beneath by crossbars composed of hingedly interconnected components.

A further advantage of the swingable support for the rope 2', as shown in FIG. 6A, resides in the fact that where the left frameworks 36 are provided with a suitable shape and the pulleys 3 are suitably suspended for swinging movement, the entire conveyor may be laterally curved at its upper run, so that it need not extend along a straight line at its upper run and, over long distances, can conform to the shape of hills and the like, so that the suspension shown at the upper left of FIG. 6A enables the direction of the conveyor to change. Once the direction is changed, there is substantially no requirement of any particular construction for redirecting the conveyor in the desired direction.

Where the conveyor extends over a long distance and a single belt 1 is used with various partial drives of various sets of ropes 2 and 2' each driven by its own motor, suspending the upper and lower pulleys 3 and 5 for one of the ropes, such as the rope 2, in the manner shown in the upper left of FIG. 6A, makes it possible to change, within a limited angle, the longitudinal direction of the conveyor belt so as to form transition arcs having a given radius. Thus, it is possible for the conveyor of the invention to accommodate itself to the particular conditions of a given landscape.

Referring to FIGS. 3A and 3B, it will be seen that by situating the pulleys 5 and 6 respectively beneath and adjacent the pulleys 3 and 4, it is possible for the return runs of the ropes 2 and 2' to be situated at an elevation only slightly lower than the forwarding runs thereof, with those hanger assemblies which are situated at the lower section of the row having their side bars inclined in the same direction as those of the upper section of the row, so that the elevational requirements for the entire conveyor is quite small with such an arrangement. Thus, the hanger assemblies of the lower section of the row have their upper ends overlapping the lower region of the hangar assemblies of the upper section of the row, so that an exceedingly compact arrangement is provided.

As is indicated in FIG. 3A it is possible simply for the side edge portions of the belt 1, at the lower run thereof, to hang downwardly, particularly where space is not a great problem. However, as is indicated in FIG. 3B, it is possible to provide inclined rollers 30 which support the opposed side edge portions of the lower run of the belt 1 so as to maintain these side edge portions of the lower run of the belt 1 directed upwardly, and in this way there is a considerable saving of space, as is apparent from a comparison of FIGS. 3A and 3B. An arrangement as shown in FIG. 3B is of course of considerable advantage in installations, such as those use on collieries or ore mines, where space is at a premium.

It is also possible to use an arrangement as shown in FIG. 4 where the support means includes a series of rollers 7 directly engaging the longitudinal central section of the lower run of the belt 1 to support the latter during its return movement. In this case each roller 7 is formed in the region of its outer ends with a pair of grooves forming pulleys for supporting the ropes 2 and 2' at their return runs, as indicated in FIG. 4.

While the hanger assemblies of the invention are capable of assuming a substantially U-shaped configuration in their supporting positions so as to provide the flexible load-carrying belt 1 with its trough-like configuration enabling it to carry a load, it is necessary, when the belt 1 passes about the pair of rotary end guide means 16 and 17, for the hanger assemblies of the invention to assume their extended position. In this way they are capable of turning with the belt 1 around the pair of rotary end guide means 16 and 17. In order to facilitate the transition of the hanger assemblies from their supporting to their extended positions and from their extended to their supporting positions, the pair of end guides 16 and 17 may be covered with rubber or the like, taking the form of tires from motor vehicles, for example.

Furthermore, in order to further facilitate the transition between the supporting and extended positions of the hanger assemblies, there is provided, as shown in FIGS. 1 and 2, in the region of the return guide means 16 an endless means 18 in the form of an endless belt, this belt 18 itself being guided around a third rotary guide means 19 which is situated in the region of the guide means 16 between the upper and lower runs of the belt. As a result the upper run of the belt 18 moves upwardly from the smaller diameter drum 19 toward the large diameter drum 16, and thus, this upper run of the belt 18 will engage the bars 25 and raise the latter as they approach the return drum 16, thus facilitating the transition of the hanger assemblies from their supporting to their extended positions. Of course, it is at this time, namely during the transition of the hanger assemblies from their supporting to their extended positions as they approach and then pass around the return guide means 16 that the load is displaced from the belt 1, and any suitable hopper may be arranged beneath the belt 18 so as to catch the material which falls from the conveyor belt 1 at this location.

It is furthermore to be noted that in addition to the rear pair of driving drums 8 shown in FIG. 2 for driving the ropes 2 and 2', the gears 10 drive a pair of forward gears 9 which are fixed with an additional forward pair of driving drums 8, and these drums coact with endless belts 28 which turn the drum 16 so that the latter will in turn advance the endless means 18 so that the latter moves in unison with the belt 1 between the latter and the drum 16, thus providing the coaction between the belt 18 and the hanger assemblies referred to above.

An endless means 20, in the form of a suitable endless belt, coacts with the starting drum 17 in the same way that the belt 18 coacts with the return drum 16. In this case also there is an additional rotary guide means 21 of a smaller diameter than the drum 17 situated in the region of the latter between the upper and lower runs of the belt 1 and around which the endless means 20 is guided. Thus, as can be seen from the upper left portion of FIG. 1, the upper run of the belt 20 will engage the intermediate bars 25 as they move downwardly during transition of the plurality of hanger means from their extended to their supporting positions. This action takes place simply by way of gravitational forces acting on the hanger assemblies of the invention, and also in the case of the belt 18 as the intermediate bars 25 are raised the side bars 24 simply swing downwardly to their extended positions due to the force of gravity. Thus, the pair of endless means 18 and 20 guarantee a gradual transition of the hanger assemblies of the invention between their extended and supporting positions.

Furthermore, during the transition of the hanger assemblies from their supporting to their extended positions at the endless means 18, the upper hook-shaped ends 23 of the side bars 24 are automatically displaced upwardly away from the ropes 2 and 2' so that there is an automatic disconnection therefrom while these ropes are guided outwardly to the driving drums 8 by the rollers 13. In the same way, during the transition of the hanger assemblies from their extended to their supporting positions at the endless means 20, the hook-shaped ends 23 automatically resume their positions extending around and supported by the ropes 2 and 2'. Thus, the conveyor of the invention can operate continuously while the hanger assemblies undergo their transitions and the belt 1 assumes its trough-shaped configuration.

The distribution of the plurality of hanger assemblies of the invention may be that which is indicated by the series of vertical dot-dash lines shown in FIG. 1 distributed in the row which has the upper and lower sections shown in FIG. 1.

In addition, the inclined supporting rollers 30 are successively situated at different inclinations, in the regions of the pair of endless guide means 16 and 17, as shown by the various rectangles 30 of different lengths of FIG. 1, so that in this way the opposed side portions of the belt 1 will be supported by the inclined rollers 30 in the manner shown in FIG. 3B but at the proper inclinations required for the transition of the belt from a location where its side edge portions are inclined to a location where the belt 1 assumes the configuration of a part of a cylinder extending around the outer portions of the drums 16 and 17. Thus, these rollers 30 also serve to support the side edge portions of the belt 1 during transition thereof from its trough-shaped configuration to its cylindrical configuration as it passes around the end drums 16 and 17.

As has been pointed out above, the capability of the plurality of hanger means of the invention to automatically assume their extended and supporting positions greatly reduces the extent to which any horizontal forces act on the ropes 2 and 2′. This elimination of horizontal forces acting on the ropes is further enhanced by the suspension of the rope-supporting pulleys by a structure such as that shown at the left of FIG. 6A. Furthermore, in the case of structures as shown in FIGS. 3A, 3B and 4, while one of the sets of pulleys such as those which support the rope 2′ may remain at predetermined locations, the other sets of pulleys, such as those which support the rope 2, may be supported for at least a limited degree of lateral shifting movement. For this purpose the pins which support the pulleys 3 and 5 are longer than the pins which support the pulleys 4 and 6 and the pulleys 3 and 5 are longitudinally slidable along the bearing pins so that these pulleys 3 and 5 can shift laterally to eliminate horizontal forces acting on the ropes.

I claim:

1. In a conveyor, a pair of endless supporting ropes each having a forwarding run and a return run, and at least said forwarding runs of said ropes being substantially coextensive and situated substantially at the same elevation, a pair of support means respectively supporting said endless ropes for respective movement along endless paths described by said ropes, a plurality of transverse hanger assemblies arranged in an endless row having an upper section and a lower section, the fraction of said plurality of transverse hanger assemblies which at any given instant are situated at said upper section of said row extending transversely between said forwarding runs of said ropes and being carried thereby, each of said transverse hanger means including a pair of side bars each having an inner end and an outer end, an intermediate bar extending between said side bars and having opposed ends situated respectively adjacent said inner ends of said side bars, and a pair of transition bars respectively having inner ends situated at said intermediate bar inwardly of said ends thereof and outer ends respectively situated at said side bars intermediate the ends thereof, each of said side bars having a hook-shaped configuration at its outer end and said outer hook-shaped ends of said side bars extending around and resting on said forwarding runs of said ropes, and each hanger assembly including a pair of swingable connecting means swingably connecting said inner ends of said side bars to said intermediate bar at the regions of the ends thereof, respectively, for swinging movement relative thereto about axes, respectively, which extend in the same general direction as said forwarding runs of said ropes, and each hanger assembly including a pair of shiftable connecting means shiftably connecting said transition bars, respectively, at least at one of the ends thereof to at least one of the other bars for longitudinal shiftable movement, relative thereto, said swingable and shiftable connecting means providing for all of said bars of each hanger assembly a range of movement relative to each other sufficiently great to displace said bars relative to each other from a fully extended position, where all of said bars extend substantially along a straight line which is substantially perpendicular to said forwarding runs of said ropes, to a supporting position where at least those hanger assemblies which at any given instant are situated at said upper section of said row form a supporting unit where said side bars extend downwardly and inwardly from said forwarding runs of said ropes with said intermediate bar extending between the inner ends of said side bars at an elevation substantially lower than said forwarding runs of said ropes and where said transition bars are respectively situated over said ends of said intermediate bar and extend between said side bars and intermediate bar, an endless load-carrying belt having upper and lower runs and having at its upper run opposed side edge portions situated between and resting against said side bars of said hanger assemblies of said upper section of said row over said transition bars, said upper run of said belt resting below said opposed side edge portions thereof at a lower face of said upper run on said transition bars and said upper run of said endless belt having between said transition bars a longitudinal central section having a lower face engaging said intermediate bars between said transition bars of said hanger assemblies, and said belt being connected with said intermediate bars between said transition bars of said assemblies, so that those hanger assemblies which at any given instant are situated at said upper section of said row and which are carried by said forwarding runs of said ropes provide for said upper run of said flexible load-carrying belt a trough-shaped configuration which can automatically adapt itself to a load carried by said belt with automatic swinging and shifting of said bars of said hanger assemblies at said upper section of said row in response to the load acting on said upper run of said belt, and a pair of rotary end guide means around which said belt is guided, said pair of end guide means forming a return guide means, toward which said upper run of said belt moves and around which said belt is guided during transition from its upper to its lower run, and a starting guide means, toward which said lower run of said belt moves and around which said belt is guided during transition from its lower to its upper run, said pair of end guide means coacting with said plurality of hanger assemblies for displacing them between their extended and supporting positions, said return guide means coacting with said plurality of hanger assemblies during transition of the latter from said supporting to their extended positions and said starting guide means coacting with said plurality of hanger assemblies during transition thereof from their extended to their supporting positions, said hook-shaped ends of said side bars of said hanger assemblies automatically engaging said forwarding runs of said ropes during transition of said hanger assemblies from their extended to their supporting positions and said hook-shaped ends of said side bars of said hanger assemblies moving away from said forwarding runs of said ropes to become automatically disengaged therefrom during transition of said hanger assemblies from their supporting to their extended positions.

2. The combination of claim 1 and wherein an endless means extends in part around said return guide means between the latter and said belt, and a third rotary guide means situated adjacent to said return guide means and being of a smaller diameter than the latter and situated between said runs of said endless belt, said endless means being guided around said third guide means and having an upper run moving from said third guide means to said return guide means, said upper run of said endless means as it approaches said return guide means engaging the intermediate bars of the hanger assemblies which are in the region of and approach said return guide means for raising the latter intermediate bars to participate in the transition of the hanger assemblies, in the region of and approaching said return guide means, from their supporting to their extended positions.

3. The combination of claim 1 and wherein at least one of said support means supports the forwarding run of one of said ropes for free lateral shifting movement toward and away from the other of said forwarding runs.

4. The combination of claim 3 and wherein said one support means includes pulleys supporting said forwarding run of said one rope and shafts on which said pulleys are freely slidable, respectively, said shafts extending transversely with respect to said forwarding run of said one rope so that the latter forwarding run is free to move toward and away of the other of said forwarding runs.

5. The combination of claim 3 and wherein said one support means includes a plurality of pulleys supporting said forwarding run of said one rope and a plurality of brackets respectively carrying said pulleys, a plurality of rods fixed to and extending upwardly from said brackets, respectively, and having upper hook-shaped ends, and a plurality of stationary hooks from which said rods are freely suspended for free swinging movement transversely with respect to said forwarding run of said one rope, so that said forwarding run of said rope is free to move toward and away from the forwarding run of the other of said ropes.

6. The combination of claim 1 and wherein said pair of swingable connecting means which swingably connect the inner ends of said side bars to the outer ends of said intermediate bar of each hanger assembly include end portions of said intermediate bar which are respectively formed with slots extending longitudinally of said intermediate bar and pins fixed to said inner ends of said side bars and extending into the latter slots so that said inner ends of said side bars are swingable and longitudinally shiftable with respect to said intermediate bar, said transition bars being pivotally connected to said side bars intermediate the ends thereof, and said intermediate bar being formed with an additional pair of slots inwardly of said slots at said end portions thereof and also extending longitudinally of said intermediate bar, said transition bars respectively carrying pins which are shiftable in said additional slots, respectively, so that during swinging of said side bars with respect to said intermediate bar said transition bars can turn with respect to said side bars and shift longitudinally along said intermediate bar, the lengths of said slots being sufficiently great to provide for the full extension of said intermediate and side bars into a straight line when they assume their extended position, all of said pins extending in the same general direction as said upper run of said belt.

7. The combination of claim 1 and wherein said transition bars are in the form of elongated channel members shiftably receiving said side and intermediate bars in their interiors, to form said shiftable connecting means, said side and intermediate bars respectively having stop portions overlapping free ends of said channel members to retain the latter connected with said side and intermediate bars while freeing said transition bars for shiftable movement relative to said side and intermediate bars and said swingable connecting means including pivotal connections of said side bars at their inner ends respectively to opposed ends of said intermediate bars.

8. The combination of claim 1 and wherein said support means includes a plurality of rollers engaging said longitudinal central portion of said lower run of said belt, and said rollers each having grooved outer end portions forming pulleys for supporting said return runs of said ropes.

9. The combination of claim 1 and wherein said support means includes pulleys supporting said return runs of said ropes, and said side bars of the fraction of the plurality of hanger means which are situated at said lower section of said row being carried by said return runs with said side bars of the latter fraction being inclined in the same direction as and located adjacent but beneath said side bars of that fraction of said plurality of hanger assemblies which are carried by said forwarding runs of said ropes, and a plurality of inclined rollers supporting at least one side edge portion of said belt at said lower run thereof.

10. The combination of claim 1 and wherein an endless means extends around said rotary starting guide means between the latter and said belt, and a third rotary guide means situated between said runs of said belt adjacent said starting guide means and around which said endless means is guided, said endless means supporting said plurality of hanger assemblies during transition thereof from said extended to said supporting positions.

References Cited

UNITED STATES PATENTS 2,751,065   6/1956   Thomson _____ 198—191

EDWARD A. SROKA, *Primary Examiner.*